US010645885B2

(12) United States Patent
Harvey et al.

(10) Patent No.: US 10,645,885 B2
(45) Date of Patent: May 12, 2020

(54) CONICAL INLET FOR DEBRIS LOADER

(71) Applicant: Harper Industries, Inc., Harper, KS (US)

(72) Inventors: Gavin Harvey, Goddard, KS (US); Andrew Gerber, Harper, KS (US); Mark Kiner, Perry, OK (US)

(73) Assignee: Harper Industries, Inc., Harper, KS (US)

(*) Notice: Subject to any disclaimer, the term of this patent is extended or adjusted under 35 U.S.C. 154(b) by 1 day.

(21) Appl. No.: 16/053,283

(22) Filed: Aug. 2, 2018

(65) Prior Publication Data

US 2019/0053441 A1   Feb. 21, 2019

Related U.S. Application Data

(60) Provisional application No. 62/546,907, filed on Aug. 17, 2017.

(51) Int. Cl.
*A01G 20/47* (2018.01)
*B02C 23/28* (2006.01)
*B02C 18/22* (2006.01)
*B02C 18/18* (2006.01)

(52) U.S. Cl.
CPC .............. *A01G 20/47* (2018.02); *B02C 18/18* (2013.01); *B02C 18/2225* (2013.01); *B02C 23/28* (2013.01)

(58) Field of Classification Search
CPC .... A01G 20/47; B02C 23/28; B02C 18/2225; B02C 18/18
See application file for complete search history.

(56) References Cited

U.S. PATENT DOCUMENTS

| | | |
|---|---|---|
| D198,433 S | 6/1964 | Sherrill |
| 3,968,938 A | 7/1976 | Ruhl |
| 4,200,950 A | 5/1980 | Coverley |
| 5,018,672 A | 5/1991 | Peck |
| 5,102,056 A | 4/1992 | Ober |
| 5,622,320 A | 4/1997 | Hubbard |
| 5,642,864 A | 7/1997 | Middlesworth |
| 5,860,606 A | 1/1999 | Tiedeman |
| 7,066,416 B2 | 6/2006 | Reinhold |
| 8,888,028 B2 | 11/2014 | Tulipuni |
| 2006/0018722 A1* | 1/2006 | Tasker ...................... A47L 5/36 406/38 |

(Continued)

*Primary Examiner* — David Redding
(74) *Attorney, Agent, or Firm* — Erickson Kernell IP, LLC; Kent R. Erickson

(57) ABSTRACT

A debris loader for comminuting or collecting leaves and debris comprises a vacuum tube connected to an intake assembly which connects to a blower housing. The blower housing contains a rotating impeller which creates suction through the vacuum tube and intake assembly drawing in leaves and debris. The leaves and debris are then discharged from the blower housing through a discharge opening or conduit. The intake assembly includes a cylindrical collar, to which a vacuum tube is attached, and a conical section which is connected to the blower housing. The diameter of the conical section expands from its connection with the cylindrical collar toward the blower housing. In a preferred embodiment the conical section is angled downward relative to the axis of rotation of the impeller and preferably at an angle of approximately thirty degrees.

16 Claims, 7 Drawing Sheets

(56) References Cited

U.S. PATENT DOCUMENTS

2006/0277714 A1* 12/2006 Dunning ............... A47L 9/1608
  15/405
2015/0139827 A1*  5/2015 Dwyer ................. F04D 29/054
  417/319

* cited by examiner

Fig. 3

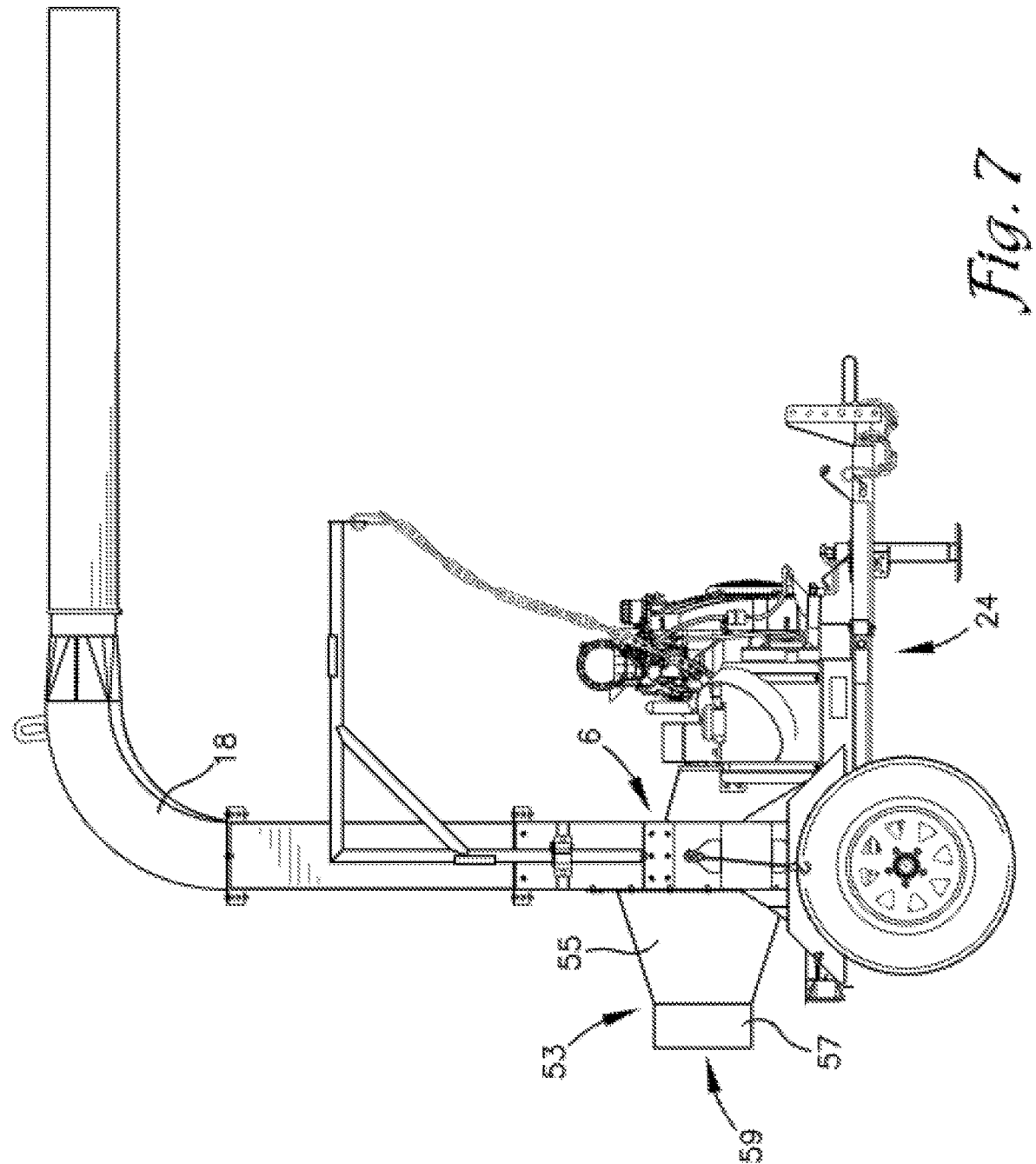

CONICAL INLET FOR DEBRIS LOADER

CROSS-REFERENCE TO RELATED APPLICATIONS

This application claims the benefit of U.S. Provisional Patent Application No. 62/546,907 filed Aug. 17, 2017, the disclosure of which is hereby incorporated herein in its entirety by reference.

BACKGROUND OF THE INVENTION

Field of the Invention

This invention relates to leaf loaders, also known as debris loaders or lawn vacuums, having a vacuum hose connected to the housing for a blower through which leaves or debris are drawn and then discharged into a collector.

Description of the Related Art

Leaf loaders, debris loaders or lawn vacuums are used to clean up leaves and other debris which accumulates in yards, streets, fields, and the like. Leaf loaders typically comprise a blower, which may also function as a comminuter or shredder, with a flexible, suction hose connected to a central, intake collar or flange on the blower housing and a discharge conduit connected tangentially to the housing for directing leaves or debris out of the blower and into a collector. The blower may be mounted on a mobile or portable frame and driven by an engine also mounted on the frame. An impeller rotatably mounted within the blower housing, creates suction for pulling debris in a stream of air into the inlet of the blower housing and then pushing the stream of air and debris entrained therein out the discharge conduit. The impeller may also shred or comminute the debris into smaller pieces and may be referred to as shredder blades, fan blades or blower blades. Suction hoses for such debris loaders typically are formed from flexible tubing of the type having a sleeve or layer of flexible material secured to a spring like coil. The coil generally maintains the sleeve of flexible material at a constant diameter through which suction from the blower draws debris. A first or near end of the suction hose is connected to the intake collar using a hose clamp or the like. A nozzle is mounted on a second or distal end of the suction hose, and a handle, connected to and projecting from the nozzle, allows an operator to move the nozzle in a sweeping motion to place the nozzle over debris to be drawn into the blower.

A common problem with leaf loaders is that the flexible, suction hose or flow line tends to kink or bend which results in clogs. The intake collar on existing blowers are cylindrical and extend in axial alignment with the axis of rotation of the blower so as to extend perpendicular to a face of the blower housing. Kinking of hoses is particularly a problem when the leaf loader is mounted on a truck or trailer because the leaf loader is two to three feet or more off the ground. When the loader is mounted on a truck or trailer, a larger drop from the leaf loader to the ground is created causing the hose to bend and kink. In such an application, the flexible vacuum hose tends to bend at right angles in close proximity to its horizontal connection with the intake collar of the blower housing, and then again at the ground where the hose is redirected from dropping vertically to extending horizontally. These right angles impair debris flow. Unclogging of the suction line may require shutting down of the entire apparatus which slows down the debris loading process.

SUMMARY OF THE INVENTION

The present invention reduces the likelihood of clogging of debris within the intake hose of a debris loader by changing the shape and orientation of the inlet or intake for the blower housing. Forming at least a portion of the intake assembly as a cone, of increasing diameter as it approaches the impeller, improves the flow of debris into and through the housing which reduces clogging. By placing the larger aperture on the blower side, the conical shape of the intake allows debris to spread and the airstream in which it is entrained slows down as it enters the blower housing. This spreading of debris to the greater conical radius area reduces bunching, packing or compacting of leaves and other debris in the flow line. Angling the intake assembly downward toward the ground reduces the bend angles in the flexible conduit connected thereto which further reduces clogging. Angling the longitudinal axis of the intake collar at an angle of approximately thirty degrees toward the ground is believed to provide the greatest reduction of potential clogging but it is foreseen that angling the longitudinal axis of the intake collar downward at an angle of approximately fifteen to sixty degrees will also reduce the bend angles in the hose sufficient to appreciably reduce clogging therein. The downward angling of the intake collar and forming the intake collar as a cone can be implemented independently or in combination.

The objects and advantages of this improvement will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 3 is an enlarged cross-sectional view of the leaf loader assembly taken along line 3-3 of FIG. 1.

FIG. 7 is an elevational view of an alternative embodiment of the leaf loader assembly showing the conical section of the intake assembly oriented with its axis extending in axial alignment with the axis of rotation of the impeller.

DETAILED DESCRIPTION OF THE PREFERRED EMBODIMENTS

Figure 1:
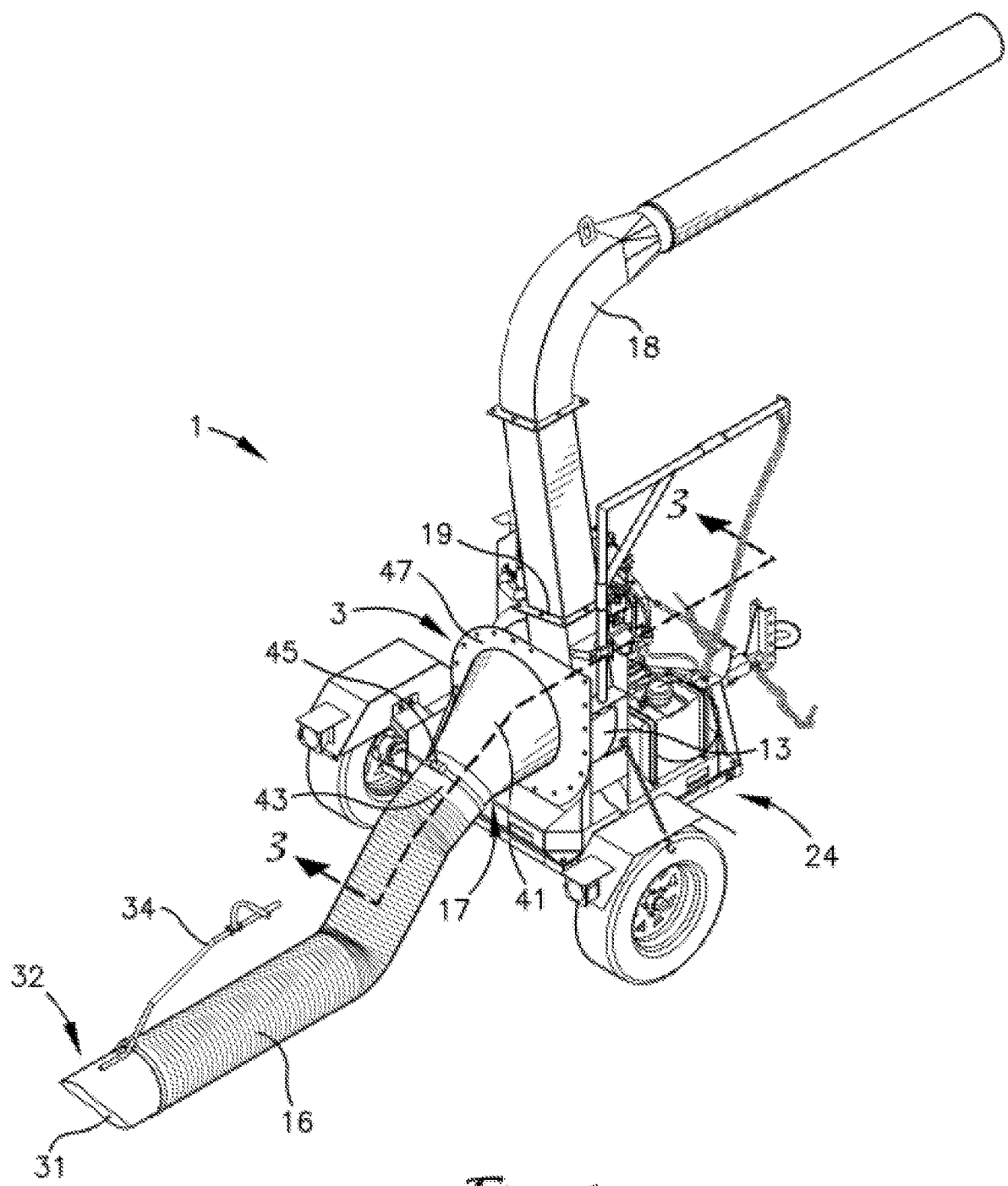
FIG. 1 is a perspective view of a leaf loader assembly with an intake assembly mounted on a blower housing of a blower including a conical section which is angled downward relative to an axis of rotation of an impeller in the blower housing.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Referring to the drawings in more detail, and with reference to FIGS. 1-5, the reference number 1 refers to a debris loader 1 comprising a blower 3 including an impeller 4 rotatably mounted about an impeller axis H within a blower housing 6. The blower housing 6 includes front and rear panels 11 and 12 and a circumferential sidewall 13 defining a space in which the impeller 4 rotates. The front panel 11 may be described as extending across a first side or first face of the blower housing 6 and the rear panel 12 may be described as extending across a second side or second face of the blower housing 6. In the embodiment shown, the impeller 4 also function as a shredder or comminuter and may be referred to as a shredding blade assembly or comminuting blade assembly. A vacuum hose 16 is flow connected to the blower housing 6 through an intake assembly 17 projecting outward from the front panel 11 of the blower housing 6, and a discharge conduit 18 extends tangentially away from the sidewall 13 of the blower housing 6 in communication with the interior of the blower housing 6 through a discharge opening 19 formed in sidewall 13. The discharge conduit 18 is configured and oriented to discharge ground or shredded debris into a receptacle, such as a truck mounted container, or onto the ground in a pile.

In the embodiment shown in FIGS. 1-5, the blower 3 is mounted on a trailer 24 which also supports a motor 26 which is operably connected to and drives a drive shaft 27 connected to impeller 4. It is foreseen that the blower 3 and motor 26 could be mounted to other structure such as a truck or on a wheeled frame.

Figure 2:
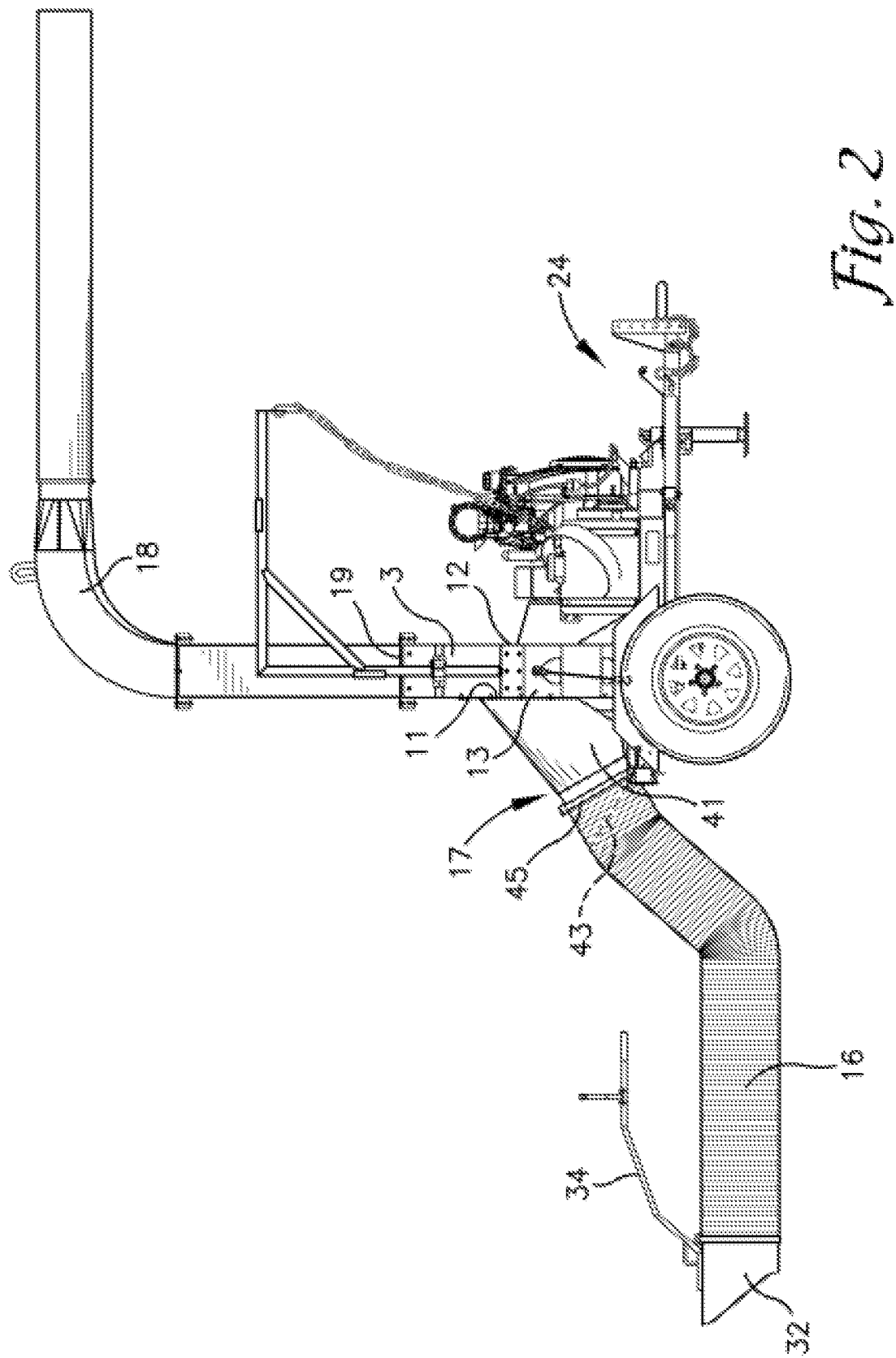
FIG. 2 is a right, side elevation view of the leaf loader assembly as in FIG. 1.
Figure 3:
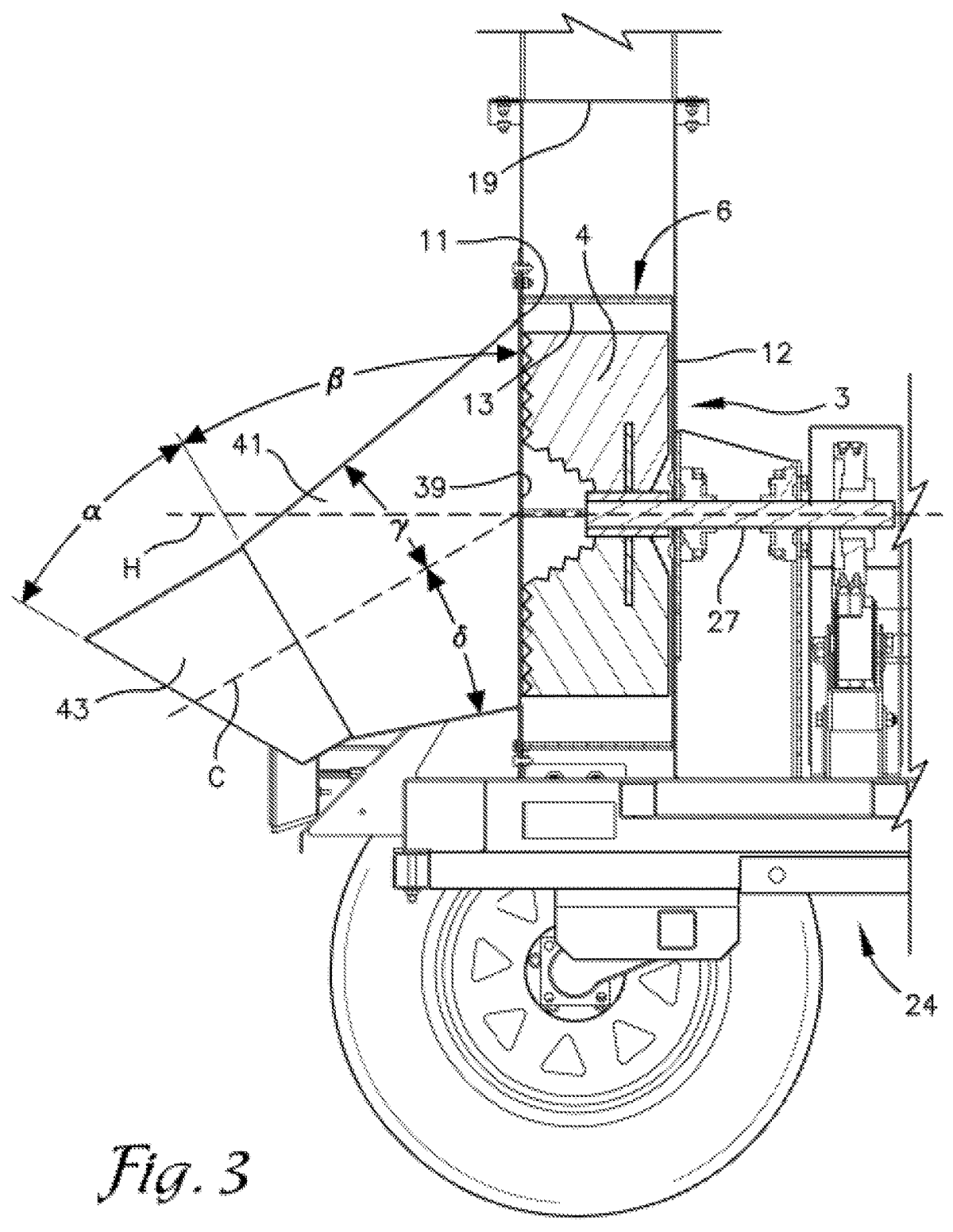
Figure 4:
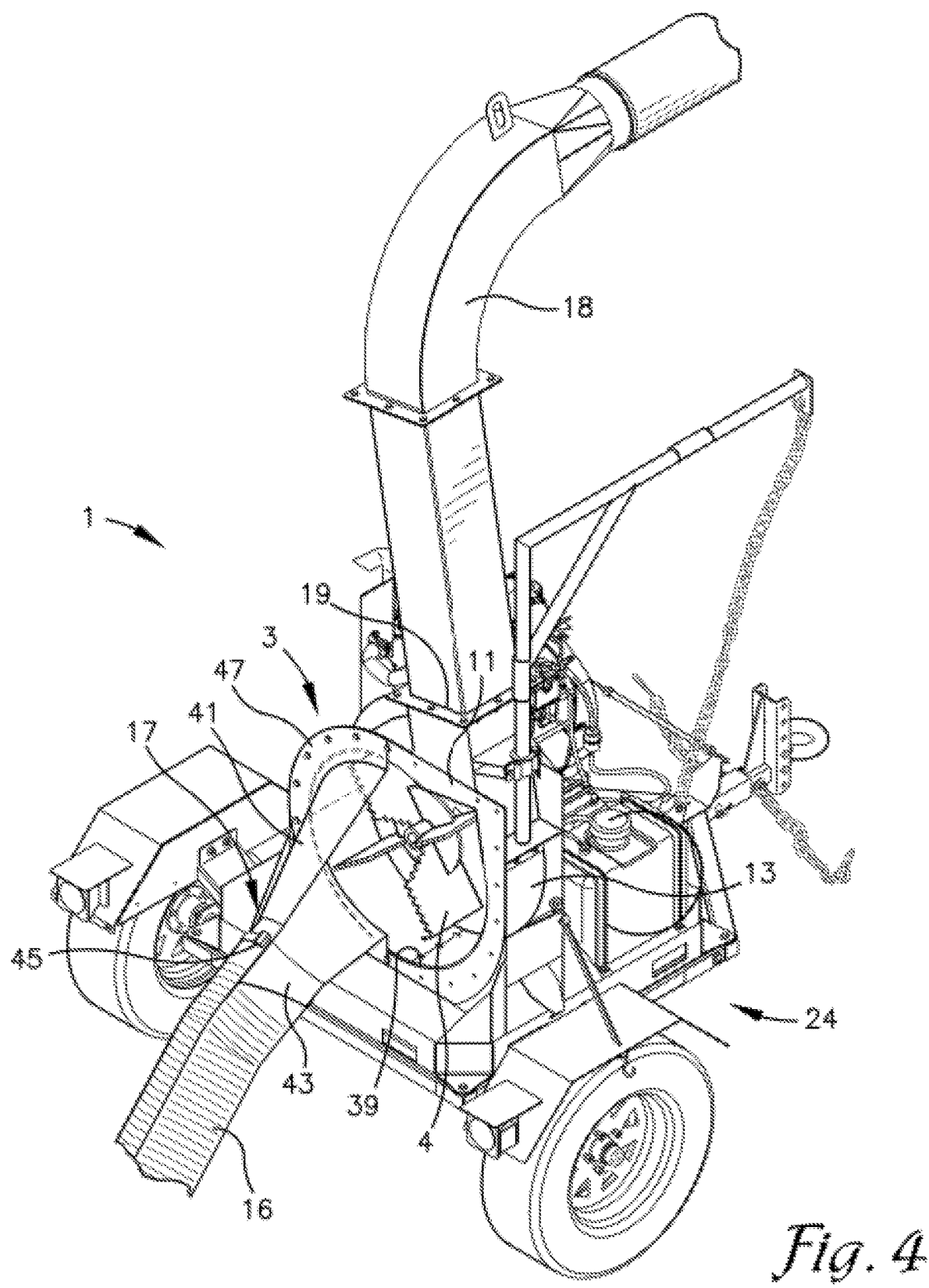
FIG. 4 is an enlarged, perspective view of the leaf loader assembly with portions of the intake assembly removed to show interior detail thereof.

With reference to FIGS. 1-3, the vacuum hose 16 is flexible and may be of the type comprising a sleeve or layer of flexible fabric secured around a metal coil. A nozzle 31 is affixed to a distal end or intake end 32 of the vacuum hose 16 and a handle 34 is affixed to and projects from nozzle 31 to facilitate movement of the nozzle 31 by an operator over debris to be drawn into the vacuum hose 16 and through blower 3. A typical diameter of the vacuum hose is twelve inches. The opposite or near end 37 of the vacuum hose is connected to the intake assembly 17. In the embodiment shown, the intake assembly 17 is connected to the front panel 11 of the blower housing 6 around an intake opening 39 formed in the front panel 11. The intake opening 39 preferably has a diameter that is approximately equal to or slightly larger than the diameter of the impeller 4 or the area circumscribed by the path of rotation of the impeller 4.

The intake assembly 17 includes a conical section or shroud 41 extending outward from the front panel 11 or first side of the blower housing 6 and a cylindrical collar 43 connected to and extending outward from a distal end of the conical shroud 41. The cylindrical collar 43 has a diameter selected for an overlapping connection of the near end 37 of the vacuum hose 16 thereto. The near end 37 of the vacuum hose 16 is slid over the cylindrical collar 43 and secured in place with a hose clamp 45 or the like.

Figure 5:
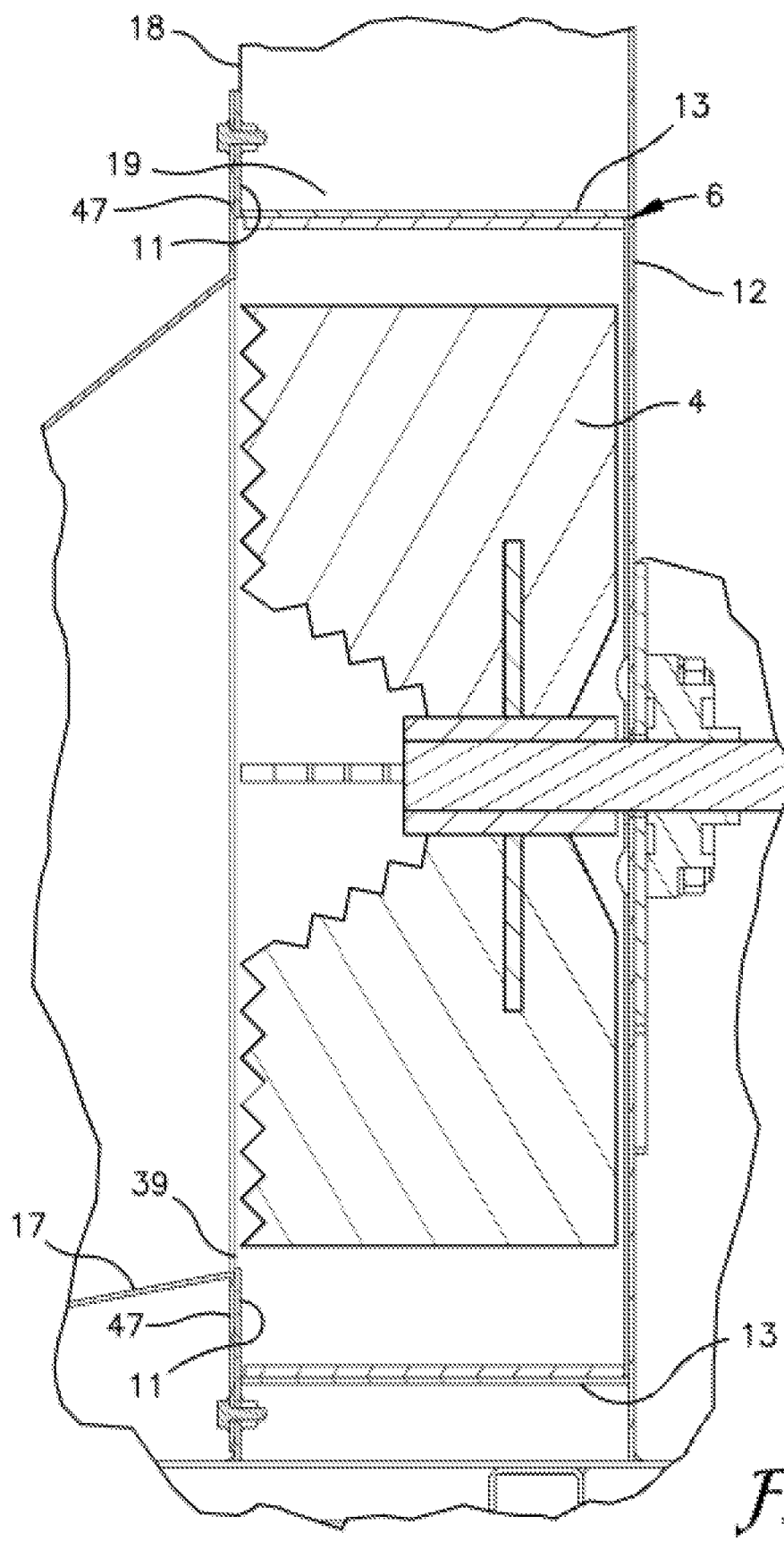
FIG. 5 is a greatly enlarged cross-sectional view similar to FIG. 3 showing additional details of the connection of the intake assembly to the blower housing

The conical shroud 41 expands in diameter from its connection to or transition with the cylindrical collar 43 to its connection to the front panel 11 of the blower housing 6 so that the diameter of the conical shroud 41 at its connection with the front panel 11 preferably is approximately equal to or slightly larger than the diameter of the impeller 4 and approximately equal to or slightly smaller than the diameter of the intake opening 39. The diameter of the impeller 4 may also be described as the diameter of the area circumscribed through rotation of the impeller 4. In one embodiment, for example, the inner diameter of the vacuum hose 16 and the outer diameter of the cylindrical collar 43 are approximately twelve inches. The diameter of the impeller 4 or the diameter of the area circumscribed by its rotation, is approximately twenty inches. The conical shroud 41 expands in diameter from twelve inches at its connection to the cylindrical collar 43 to twenty or twenty-one inches at its connection to the front panel 11 and around the intake opening 39. The diameter of the intake opening 39 formed in the front panel 11 may be formed larger than the diameter of the end of the conical shroud 41 positioned adjacent the intake opening 39. A mounting flange 47, formed on the wider end of the conical shroud 41 and projecting radially outward therefrom, is positioned against and used to bolt or otherwise connect or fasten the conical shroud 41 to the front panel 11 of the blower housing 6. By expanding the diameter of the intake assembly 17 as it approaches the intake opening 39 to the blower housing 6, the flow of entrained material through the blower housing 6 is improved. A schematic representation of the improved flow of entrained material through the conical shroud 41 is shown in FIG. 5.

In the embodiment shown in FIGS. 1-5, the intake assembly 17 is angled downward, toward the ground at an angle of approximately thirty degrees from horizontal, and more specifically, a longitudinal axis or cone axis C through intake assembly 17 extends at an angle of approximately thirty degrees below the rotational axis H of the impeller 4 or below a horizontal axis if the blower 3 is supported on level ground. The distal end of the cylindrical collar 43 may be cut or formed at an acute angle relative to a distal end of the conical section 41, so that an upper edge of the collar 43 extends further away from the blower housing 6 and from the distal end of the conical section 41 than a lower edge of the collar 43 to further reducing kinking of the vacuum hose 16 at its point of connection with the collar 43. Angling the intake assembly 17 downward toward the ground reduces the bend angles in the vacuum hose 16 connected thereto which reduces clogging. Angling the longitudinal axis of the intake assembly 17 at an angle of approximately thirty degrees toward the ground is believed to provide the greatest reduction of potential clogging but it is foreseen that angling the longitudinal axis of the intake assembly 17 downward at an angle of between approximately fifteen to sixty degrees will also reduce the bend angles in the hose sufficient to appreciably reduce clogging therein.

Referring to FIG. 3, in the embodiment shown, the angle formed between the front face or panel 11 of the blower housing 6 and the distal end of the conical section 41, angle β, is approximately thirty degrees. The angle between the distal end of the conical section 41 and the distal end of the cylindrical collar 43, angle α, is also approximately thirty degrees. The conical section 41, in the embodiment shown in FIGS. 1-5, is not a perfect cone. Because the conical section 41 is angled downward, relative to the impeller axis H, the slope of the lower portion of the conical section sidewall is greater than the slope of the upper portion of the conical section sidewall so that the inner end of the conical section 41 can circumscribe the intake opening 39. In the embodiment shown in FIGS. 1-5, the slope, angle γ of the sidewall of conical section 41, along its upper edge as oriented in FIG. 3 and relative to the cone axis C, is approximately nine degrees. The slope, angle δ, of the sidewall of conical section 41, along its lower edge as oriented in FIG. 3 and relative to the cone axis C, is approximately twenty-nine degrees.

Figure 6:
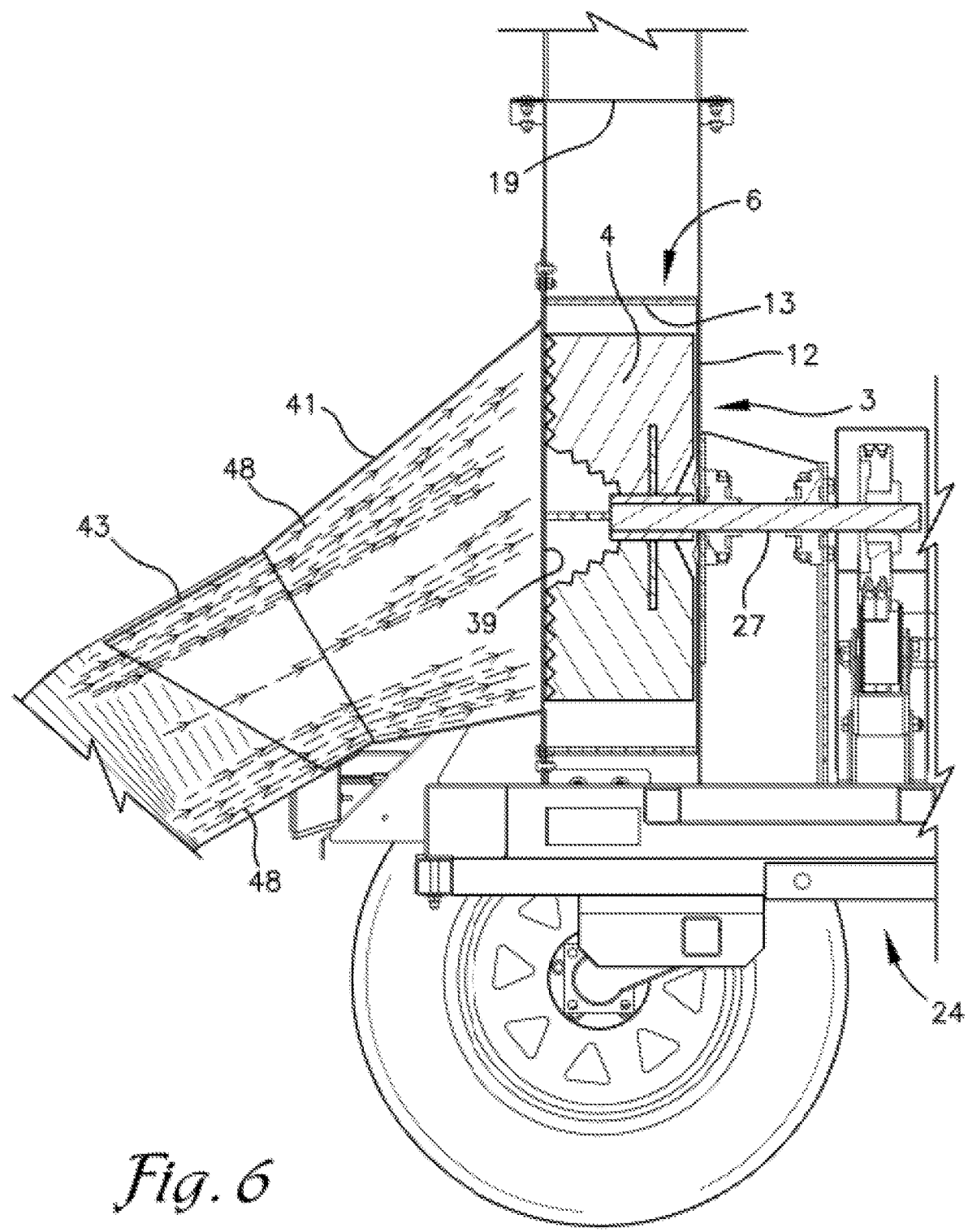
FIG. 6 is a view similar to FIG. 3, showing the diverging flow path of air drawn into the intake assembly.

Forming at least a portion of the intake assembly 17 as a cone, of increasing diameter as it approaches the impeller 4, improves the flow of debris into and through the blower housing 6 which also reduces clogging. The improved flow of entrained material through the intake assembly 17 is shown schematically in FIG. 6 with lines 48 generally representing the path of air drawn into the intake assembly 17. By placing the larger aperture on the blower side, the conical shape of the intake 17 allows debris to spread out or disperse, reducing its density in the air stream and the airstream in which it is entrained slows down as it enters the blower housing 6. Reducing the density of debris entrained in the stream of air entering the blower housing 6 and reducing the velocity of the air entering the blower housing 6 due to the increased diameter proximate the blower housing 6 reduces bunching, packing or compacting of leaves and other debris entering the blower housing 6.

Referring to FIG. 7, an alternative embodiment of the debris loader 51 is shown having an intake assembly 53 comprising a conical section 55 and a cylindrical collar 57 in which the longitudinal axis of the intake assembly 53, extending through both the conical section 55 and the collar 57 is aligned with axis of rotation of the impeller 4. The diameter of the conical section 55 of intake assembly 53 adjacent the intake opening 39 is sized to be approximately the same as the diameter of the intake opening 39 and approximately the same as the diameter of the area circumscribed by rotation of the impeller 4.

It is to be understood that while certain forms of the present invention have been illustrated and described herein, it is not to be limited to the specific forms or arrangement of parts described and shown.

What is claimed and desired to be secured by Letters Patent is as follows:

1. A debris loader to which a vacuum tube may be connected comprising:
    a) a blower comprising an impeller rotatably mounted about an impeller axis within a blower housing, the blower housing having an intake opening formed in and extending through a first side of the blower housing, the intake opening having a diameter that is approximately the same as the diameter of an area circumscribed by the impeller;
    b) an intake assembly connected to the blower housing around the intake opening, the intake assembly including a conical section extending outward from the first side of the blower housing and a cylindrical collar connected to and extending outward from a distal end of the conical section, the cylindrical collar having a diameter selected for connection of a near end of the vacuum tube thereto, the conical section expanding in diameter from its connection to the cylindrical collar to its connection to the blower housing, wherein a diameter of said conical section adjacent the blower housing has a diameter that is approximately the same as the diameter of the intake opening.

2. The debris loader as in claim 1 wherein said intake assembly is angled downward relative to said first side of said blower housing such that a longitudinal axis through said intake assembly extends at an acute angle downward relative to the impeller axis.

3. The debris loader as in claim 1 wherein said intake assembly is angled downward relative to said first side of said blower housing such that a longitudinal axis through said intake assembly extends at an angle of approximately fifteen to sixty degrees downward relative to the impeller axis.

4. The debris loader as in claim 1 wherein said intake assembly is angled downward relative to said first side of said blower housing such that a longitudinal axis through said intake assembly extends at an angle of approximately twenty-five to thirty-five degrees downward relative to the impeller axis.

5. The debris loader as in claim 1 in combination with the vacuum tube and wherein a nozzle is connected to a distal end of the vacuum tube.

6. The debris loader as in claim 2 wherein a slope of an upper portion of a sidewall of the conical section relative to the longitudinal axis through the intake assembly is smaller than the slope of a lower portion of the sidewall of the conical section relative to the longitudinal axis through the intake assembly.

7. A debris loader to which a vacuum tube may be connected comprising:
    a) a blower comprising an impeller rotatably mounted about an impeller axis within a blower housing, the blower housing having an intake opening formed in a first side thereof; wherein said intake opening has a diameter that is approximately the same as the diameter of an area circumscribed by the impeller;
    b) an intake assembly connected to the blower housing around the intake opening, the intake assembly including a conical section extending outward from the first side of the blower housing and a cylindrical collar connected to and extending outward from a distal end of the conical section, the cylindrical collar having a diameter selected for connection of a near end of the vacuum tube thereto, the conical section expanding in diameter from its connection to the cylindrical collar to its connection to the blower housing; wherein a diameter of said conical section adjacent the blower housing has a diameter that is approximately the same as the diameter of the intake opening; said intake assembly is angled downward relative to said front panel such that a longitudinal axis through said intake assembly extends at an acute angle downward relative to the impeller axis.

8. The debris loader as in claim 7 wherein said intake assembly is angled downward relative to said first side of said blower housing such that a longitudinal axis through said intake assembly extends at an angle of approximately fifteen to sixty degrees relative to the impeller axis.

9. The debris loader as in claim 7 wherein said intake assembly is angled downward relative to said first side of said blower housing such that a longitudinal axis through said intake assembly extends at an angle of approximately twenty-five to thirty-five degrees relative to the impeller axis.

10. The debris loader as in claim 7 in combination with the vacuum tube and the vacuum tube includes a nozzle is connected to a distal end of the vacuum tube.

11. The debris loader as in claim 7 wherein a slope of an upper portion of a sidewall of the conical section relative to the longitudinal axis through the intake assembly is smaller than the slope of a lower portion of the sidewall of the conical section relative to the longitudinal axis through the intake assembly.

12. A debris loader comprising:
a) a vacuum tube having a nozzle connected to a distal end thereof;
b) a blower comprising an impeller rotatably mounted about an impeller axis within a blower housing, the blower housing having a front panel with an intake opening formed in and extending through the front panel; wherein said intake opening has a diameter that is approximately the same as the diameter of an area circumscribed by the impeller;
c) an intake assembly connected to the front panel of the blower housing around the intake opening, the intake assembly including a conical section extending outward from the front panel of the blower housing and a cylindrical collar connected to and extending outward from a distal end of the conical section, the cylindrical collar having a diameter selected for connection of a near end of the vacuum tube thereto, the conical section expanding in diameter from its connection to the cylindrical collar to its connection to the front panel of the blower housing; wherein a diameter of said conical section adjacent the front panel of the blower housing has a diameter that is approximately the same as the diameter of the intake opening; said intake assembly is angled downward relative to said front panel such that a longitudinal axis through said intake assembly extends at an acute angle relative to the impeller axis.

13. The debris loader as in claim 12 wherein said intake assembly is angled downward relative to said front panel such that a longitudinal axis through said intake assembly extends at an angle of approximately fifteen to sixty degrees downward relative to the impeller axis.

14. The debris loader as in claim 12 wherein said intake assembly is angled downward relative to said front panel such that a longitudinal axis through said intake assembly extends at an angle of approximately twenty-five to thirty-five degrees relative to the impeller axis.

15. The debris loader as in claim 12 wherein a nozzle is connected to a distal end of the vacuum tube.

16. The debris loader as in claim 12 wherein a slope of an upper portion of a sidewall of the conical section relative to the longitudinal axis through the intake assembly is smaller than the slope of a lower portion of the sidewall of the conical section relative to longitudinal axis through the intake assembly.

* * * * *